May 19, 1959 V. BALASS 2,887,188
FORCE STORAGE BRAKE FOR MOTOR VEHICLES
Filed Feb. 8, 1956 2 Sheets-Sheet 1

INVENTOR:
VALENTIN BALASS

May 19, 1959    V. BALASS    2,887,188
FORCE STORAGE BRAKE FOR MOTOR VEHICLES
Filed Feb. 8, 1956    2 Sheets-Sheet 2

INVENTOR:
VALENTIN BALASS

United States Patent Office 2,887,188
Patented May 19, 1959

2,887,188

FORCE STORAGE BRAKE FOR MOTOR VEHICLES

Valentin Balass, Zurich, Switzerland, assignor to Tetra A.G. für Hydraulische Bremsen und Apparate, Dietlikon-Zurich, Switzerland, a corporation of Switzerland Application February 8, 1956, Serial No. 564,323

Claims priority, application Switzerland February 16, 1955

1 Claim. (Cl. 188—170)

The invention relates to a force storage brake for automotive and other vehicles.

Known force storage brakes have the disadvantage that they cannot be used as normal-operation brakes, since once the stored force, usually spring force, has been released, it is no longer practical to keep under control during the braking process. Spring storage brakes have therefore hitherto been used only as emergency brakes or breakaway brakes for trailers, while another brake system always had to be provided for the normal-operation brakes.

In order to obviate these disadvantages, the force storage brake according to the invention has two force storage means, one of which generates brake force on discharge while the other seeks to prevent the discharge of the brake force storage means by means of a counteracting force. Said brake also has a control by means of which the brake force storage means is discharged and the counteracting force storage means simultaneously charged on the application of the brake, and the counteracting force storage means is discharged and the brake force storage means, re-charged on the release of the brake.

Such a force storage brake can be used as an independent normal-operation brake and at the same time also as an emergency break or breakaway brake. The combination, according to the invention, of two force storage means renders it possible gradually and sensitively to develop a large brake force with this force storage brake by using only a slight operating force, and also gradually to fade out said brake force merely by a movement of the brake control.

The force storage means is preferably constructed as spring force storage means.

It is advisable so to dimension and arrange both force storage means that when the brake is released, the counteracting force and the stored force of the brake force storage means are in equilibrium so that by the action of the brake control on the counteracting force storage means this equilibrium is eliminated and the brake can be applied.

In order to enable the invention to be more readily understood, reference is made to the accompanying drawings which illustrate diagrammatically and by way of example, two positions thereof and in which:

Fig. 3 shows the force storage brake used on a tractor with a trailer.

Figure 1:
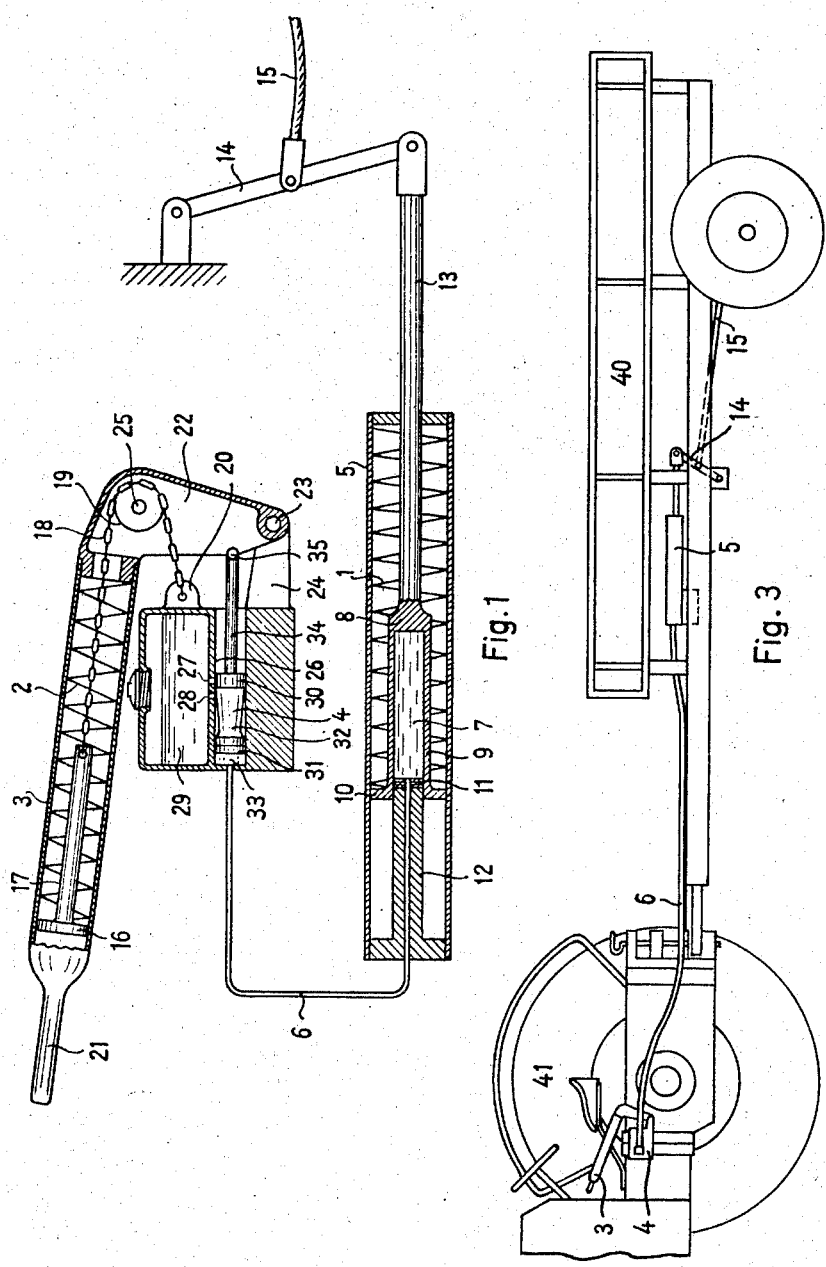
Fig. 1 illustrates the force storage brake in the "off" position.
Figure 2:
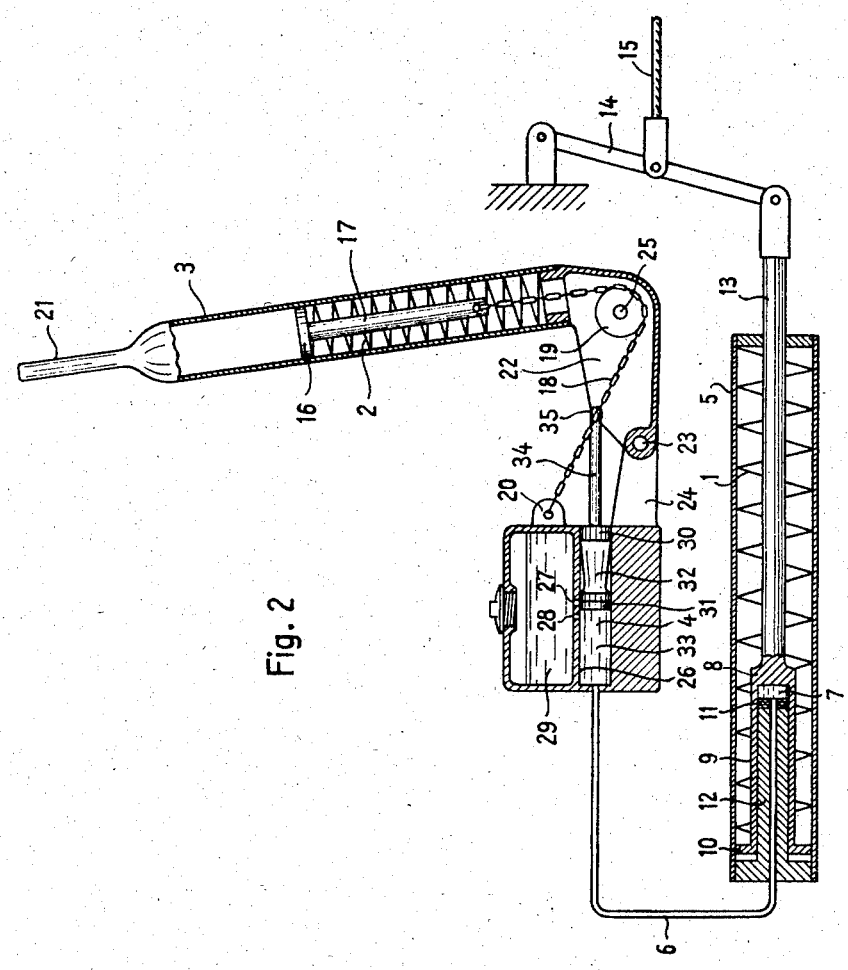
Fig. 2 illustrates the force storage brake of Fig. 1 in the "on" position.

In the position illustrated in Figs. 1 and 2, the force storage brake has, as main parts, a compression spring 1 serving as brake force storage means, a compression spring 2 serving as counteracting force storage means, a lever 3 serving as brake control, and a pump 4 by means of which the lever 3 can hydraulically tension and release the tension of the spring 1.

The spring 1 is disposed in a force storage cylinder 5, which is connected to the pump 4 by means of a pipeline 6, so that a fluid pressure effecting the tensioning or tension release of the spring 1 can be produced in a pressure chamber 7 of the force storage cylinder 5 by means of said pump 4. A piston 8 serves to transmit this pressure to the spring 1, the projecting rim of said piston serving as cylindrical wall 9 of the pressure chamber 7 and as spring retainer for the spring 1. The pressure chamber 7 is closed by a housing part 12 of the force storage cylinder 5 which housing part 12 is provided with a seal 11. The piston 8 possesses a piston rod 13, which is connected by a linkage 14 to a brake cable 15, which latter is connected to braking members (not illustrated) of the vehicle wheels.

A tube, in which the spring 2 is disposed, serves as brake lever 3 so that the counteracting force storage means is situated in the force storage brake control member. The spring 2 possesses a tensioning device, which consists of a spring retainer 16, a tension rod 17, a chain 18 and a sprocket wheel 19 and which is anchored fast outside the brake lever 3, namely on a projection 20 on the pump housing. The brake lever 3 has a handle 21 on the one side, and on the other side, a bent part 22, which is connected at one end rotatably about a spindle 23 to a pump housing projection 24. The sprocket wheel 19 is rotatably mounted on a shaft 25 in the bent part 22 of the brake lever 3.

The pump 4 has a cylinder 26, which is connected by a replenishing opening 27 and a pressure equalising bore 28 to a fluid container 29, in which the fluid serving as working medium in the pump 4 is at atmospheric pressure. In the cylinder 26 is disposed a piston 32, which is provided with packings 30, 31 on both sides and which movably closes a pressure chamber 33 of the cylinder 26. A rubber sleeve, which seals on one side only and which is adapted to admit fluid into the pressure chamber 33, serves as packing 31 of the piston 32 on the pressure chamber side. The pressure chamber 33 is connected to the pressure chamber 7 of the force storage cylinder 5 by the pipeline 6. The pump piston 32 has a piston rod 34, which is connected by a joint 35 to the bent part 22 of the brake lever 3.

The mode of operation of the aforedescribed force storage brake is as follows:

In the "off" position of the brake shown in Fig. 1, the brake force storage means is charged, that is to say, the spring 1 is tensioned and the counteracting force storage means is largely discharged, that is to say the spring 2 is largely released of tension. Accordingly, the piston 8 is situated in its inner dead centre position and the brake cable 15 is not tensioned. The stored force of the spring 1 exerts a pressure, by means of the piston 8, upon the fluid in the chamber 7, which pressure is transmitted into the pressure chamber 33 through the pipeline 6 and seeks to raise the brake lever 3 by means of the piston 32 and the piston rod 34. Said pressure however, is opposed by the spring 2, which, by a counteracting force, pulls the bent part 22 of the brake lever 3 by means of the chain 18 against the pump housing projection 20 and thus prevents a change of position of the brake lever 3 and tension release of the spring 1. For this purpose, the springs 1, 2 and the operative lever arms of the forces acting upon the brake lever 3 are so dimensioned that when the brake is off, the stored force of the spring 1 and the counteracting force of the spring 2 are in equilibrium, so that although no special arresting means is provided the brake lever 3 remains in the brake release position.

If, as shown in Fig. 2, the brake is to be applied, the equilibrium is discontinued by the action of muscular force on the handle 21 of the brake lever 3 and the latter is raised. At the same time, the chain wheel 19 moves away from the anchoring of the chain 18 on the pump housing projection 20, so that the spring 2 is tensioned. The pump piston 32 follows the movement of the bent part 22 of the brake lever 3, thus resulting in an increase in size of the pump pressure chamber 33. Under the pressure of the simultaneously relaxing spring 1 the piston 8 of the force storage cylinder 5 displaces fluid from the pressure chamber 7 of the latter into the pump pressure chamber 33 and at the same time tensions the brake cable 15 by means of the piston rod 13 and the linkage 14. The bore 28 is so disposed that when the pump piston 32 is in the end position shown in Fig. 2 and hence when the brake lever 3 is in a predetermined position, it establishes communication between the pressure chamber 33 of the pump 4 and therefore also the pressure chamber 7 of the force storage cylinder 5 and the fluid container 29, thus fading out any excess pressure in these pressure chambers 7 and 33, so that the entire force of the spring 1 acts upon the braking linkage 14, while the muscular force keeps equilibrium with the counteracting force of the spring 2. As a rule however, full braking will take place before the pump piston 32 has exposed the bore 28, so that a part of the stored force of the spring 1 will still counteract the counteracting force of the spring 2.

Only slight muscular force is required for braking, i.e., to raise the brake lever 3 and hence to tension the spring 2, since the stored force of the spring 1 also seeks to raise the brake lever 3 by means of the pump piston 32. This force continually decreases however, since even after the commencement of braking the piston 8 moves to the left in consequence of the flexible resilience of numerous members, and particularly of the brake linkage, and at the same time a continually increasing force component acts as brake force while on the charging of the counteracting force storage means 2—which takes place simultaneously—the counteracting force continually increases so that the force which opposes the raising of the brake lever 3 becomes larger and larger and the force which seeks to raise the brake lever 3 becomes smaller and smaller. This is opposed however by the fact that on the raising of the brake lever 3 the active lever arm of the counteracting force, namely the shortest distance between the chain 18 and the shaft 23, becomes increasingly smaller so that in every position of the brake lever 3 the part of the stored force of the brake force storage means 1 not acting as brake force and the counteracting force of the counteracting force storage means maintain equilibrium. Thus the force storage brake is at the same time a reliable hand brake, since the brake lever 3 remains in any position without the aid of a special arresting means. This also has the advantage for example that on braking on a long downward incline it is not necessary to keep the brake lever constantly in the hand, but it is sufficient to put it into the position corresponding to the desired braking action.

As illustrated in Fig. 3, the force storage cylinder 5 is disposed on a trailer 40 and connected to the pump 4, disposed on a tractor 41, by a flexible pipeline 6. Since the brake lever 3 is also disposed together with the pump 4 on the tractive vehicle the trailer 40 can be braked from the latter. In addition, this force storage brake also acts as a breakaway brake, since when the flexible pipe 6 is broken apart, the pressure loss in the force storage cylinder 5 causes the tension of the force storage spring disposed therein to be released and hence causes the brake cable 15 to be tightened automatically by means of the linkage 14.

The brake lever 3 and the pump 4 can be connected to the tractive vehicle 41 so as to be readily detachable in order that the entire force storage brake may if necessary be used on the trailer itself as a normal-operation or hand brake.

Various changes and modifications may be made without departing from the spirit and scope of the present invention and it is intended that such obvious changes and modifications be embraced by the annexed claim.

Having thus described the invention, what is claimed as new and desired to be secured by Letters Patent is:

A force storage brake operating means for vehicles, comprising a control pump means, and a fluid motor means connected to said pump means for operation by said pump means, said control pump means including a pump, a tubular lever for operating said pump, a first spring means, one end connected in said tubular lever and the other end anchored fast, so that said spring is stressed when said tubular lever is moved to operate said pump to withdraw fluid, said fluid motor means including a hydraulic cylinder, a piston for actuating said brake, and a second spring means for biasing said piston into brake applying position so that on movement of said tubular lever in the direction of brake application said first spring means is stressed and said pump operated to withdraw fluid and said second spring means urging said piston in brake application position.

References Cited in the file of this patent
UNITED STATES PATENTS

| | | |
|---|---|---|
| 1,680,204 | Charles | Aug. 7, 1928 |
| 2,111,304 | Turgot | Mar. 15, 1938 |
| 2,308,299 | Page | Jan. 12, 1943 |